United States Patent [19]

van der Lely et al.

[11] Patent Number: 4,465,142

[45] Date of Patent: Aug. 14, 1984

[54] TRACTOR WITH GROUND ROTATED MEMBER AND DRIVEN WHEEL REVOLUTION COUNTERS AND IMPLEMENT LIFT MEANS OPERATIVELY CONNECTED THERETO

[75] Inventors: Ary van der Lely, Maasland; Cornelis J. G. Bom, Rozenburg; Arie Kuipers, Brielle, all of Netherlands

[73] Assignee: C. Van der Lely N.V., Maasland, Netherlands

[21] Appl. No.: 325,128

[22] Filed: Nov. 27, 1981

Related U.S. Application Data

[63] Continuation of Ser. No. 099,732, Dec. 3, 1979, Pat. No. 4,344,499.

[30] Foreign Application Priority Data

Dec. 8, 1978 [NL] Netherlands .......................... 7811964

[51] Int. Cl.³ .......................................... A01B 63/112
[52] U.S. Cl. ....................................... 172/7; 180/197; 364/426
[58] Field of Search ......................... 172/2, 3, 7, 9, 11; 180/192; 123/352, 353, 354; 303/96; 364/424, 426

[56] References Cited

U.S. PATENT DOCUMENTS

| 3,811,526 | 5/1974 | Adahan | 180/197 |
| 4,086,563 | 4/1978 | Bachman | 180/197 X |
| 4,098,367 | 7/1978 | Fleischer | 123/352 X |
| 4,125,295 | 11/1978 | Ruhnav et al. | 180/197 X |

FOREIGN PATENT DOCUMENTS

| 2429594 | 1/1975 | Fed. Rep. of Germany | 172/7 |
| 1425220 | 2/1976 | United Kingdom | 180/197 |

Primary Examiner—Richard T. Stouffer
Attorney, Agent, or Firm—Penrose Lucas Albright

[57] ABSTRACT

A tractor is provided with a wheel slippage control to regulate the load produced by an implement. Wheel slippage is measured by pulses received from tachometers measuring the rotation of a non-driven wheel and a driven wheel. These pulses are applied to associated counters, where the total number of pulses received from each wheel is continuously counted. If the difference between the counts of the counters reaches a preset amount, a signal is applied to the control valve of a lifting device attached to the tractor, so that an implement carried by the device penetrates less deeply into the soil. After the lifting device has been energized, the counters are reset to zero to continue counting until reset again.

5 Claims, 2 Drawing Figures

TRACTOR WITH GROUND ROTATED MEMBER AND DRIVEN WHEEL REVOLUTION COUNTERS AND IMPLEMENT LIFT MEANS OPERATIVELY CONNECTED THERETO

RELATED APPLICATIONS

This is a continuation of Ser. No. 99,732 filed Dec. 3, 1979, which issued as U.S. Pat. No. 4,344,499 on Aug. 17, 1982.

BACKGROUND OF THE INVENTION

This invention relates to a tractor.

When a conventional tractor is used for carrying out operations such as plowing, the driver's attention is required on the one hand for steering the tractor and on the other hand for controlling the tractor drive in accordance with the load imposed on the tractor by the implement. When the tractor is operating under conditions of maximum load, this load control demands so much attention that the steering of the tractor is likely to be somewhat neglected so that the risk of erroneous maneuvering and of accidents is considerably increased.

SUMMARY OF THE INVENTION

According to the present invention, there is provided a tractor comprising an engine, wheels which are driven by the engine through a torque converter, and a lifting device for attachment to an implement, the tractor further comprising control means adapted to adjust automatically the transmission ratio of the torque converter in dependence upon skidding, or more accurately, the slipping or spinning of at least one of the engine-driven wheels of the tractor with respect to the ground.

BRIEF DESCRIPTION OF THE DRAWINGS

For a better understanding of the present invention and to show how it may be carried into effect, reference will now be made, by way of example, to the accompanying drawings, in which.

DESCRIPTION OF THE PREFERRED EMBODIMENTS

Figure 1:
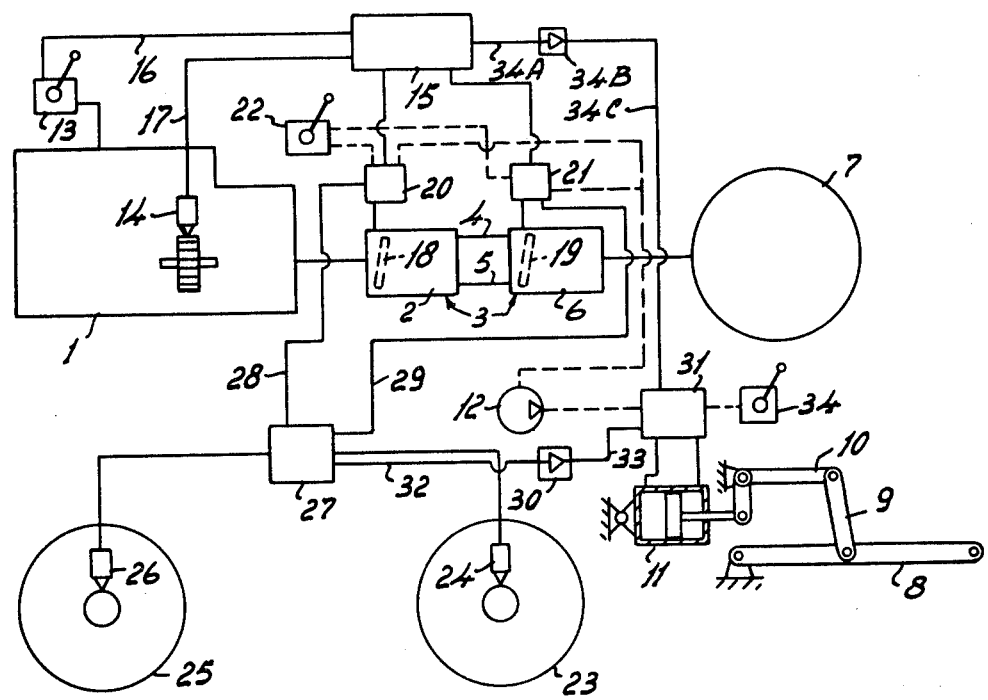
FIG. 1 is a circuit diagram representing an automatic control arrangement in a load-hauling tractor.

The automatic load control of the tractor relates to the "drive of the tractor." The term drive of the tractor is to be understood to mean the controllable magnitudes capable of influencing the values of the external forces acting on the tractor at a given maximum engine power, the transmission ratio between the driving engine and the ground wheels and the position of the lifting device which directly determines the magnitude of the tractive force exerted by an implement (for example, a plow).

The engine 1 of the tractor drives a hydraulic pump 2 of an infinitely variable torque converter or hydraulic change-speed system 3 of the tractor. The hydraulic pump 2 is coupled by a hydraulic high-pressure conduit 5 and a hydraulic low-pressure conduit 5 with a hydraulic motor 6 of the change-speed system 3. The hydraulic motor 6 is coupled with driven ground wheels 7 of the tractor. The hydraulic pump 2 has a swashplate 18 and the hydraulic motor 6 has a swashplate 19.

The tractor has one or more lifting devices, each comprising two lifting arms 8 which are pivotally fastened to the tractor frame and which can be elevated by means of lifting rods 9, operated by levers 10 which can pivot with respect to the tractor frame. These levers 10 can be pivoted by one or more hydraulic rams 11, which may be double-acting, to which hydraulic fluid under pressure can be supplied by a separate hydraulic pump 12 driven by the engine 1. This lifting device may be part of a three-point hitch.

The engine 1, which in this embodiment is a Diesel engine, is controlled principally by setting a desired speed by adjusting the position of a manual control 13; commonly, the control 13 is coupled by a mechanical linkage with a regulator for setting the rate of fuel injection into the engine cylinders. This means that a reduction of the speed of the engine due to an increase in load (applied by an implement hitched to the lifting device 8 to 11) results in an increase in the rate of fuel injection, which increases the engine torque, until the set speed is reached.

The output speed of the engine 1 is measured by a tachometer pick-up 14. This pick-up 14 may be disposed near the circumference of a fly-wheel or similar disc fastened to the output shaft. For example, the fly-wheel may have a number of uniformly spaced notches around its circumference and then the pick-up 14 may be an inductive pick-up producing a pulse as each notch of the fly-wheel passes it. Therefore, the frequency of these pulses is a measure of the speed of the output shaft of the engine 1 and can be compared in an electronic signal processing device 15 with a desired frequency set by the manual control 13 and supplied to the device 15 through a lead 16. The tachometer pick-up 14 is connected by a lead 17 to the signal processing device 15. The difference between the two frequencies is assessed in the device 15, this difference being a measure of the difference between the power required to overcome the retarding force of the implement, for example a plow, and the maximum power that can be delivered at the speed set by the manual control 13. The power required to overcome the retarding force of the implement is, of course, dependent upon the travel speed of the tractor, which travel speed is controlled by the transmission ratio between the engine 1 and the wheels 7, this ratio being determined by the position of the swashplate 18 of the pump 2 or by the position of the swashplate 19 of the motor 6 of the change-speed system 3 or by both. In general it will be possible to adjust only the swashplate 18 of the pump 2 or only the swashplate 19 of the motor 6 or to adjust both swashplates 18 and 19.

The presence or absence of a frequency difference corresponding to the difference between the desired engine speed (set, for example, by means of an astable multivibrator adjustable by the manual control (13) and the actual engine speed is assessed in the device 15 by a comparator on the basis of pulses counted by counters in a given counting time. If the engine speed drops, the comparator detects the frequency difference and delivers an amplified signal to a control valve 20 for adjusting the swashplate 18 of the pump 2 or to a control valve 21 for adjusting the swashplate 19 of the motor 6, or to both, so as to raise the transmission ratio of the change-speed system 3 so that the driven ground wheels will rotate more slowly. Thus the power required for drawing the implement is reduced so that the output speed of the Diesel engine 1 will again approach the value set by the manual control 13. By this means, the drive train of the tractor automatically adjusts to match the load imposed by the implement.

The hydraulic control valves 20 and 21 can be fed by the hydraulic pump 12 of the lifting device. It should furthermore be noted that the starting signal for the counters should be delayed until steady operation is established, since when starting from a standstill there will always be a frequency difference for some time. This delay can be achieved by deriving the starting signal from, for example, an astable multivibrator connected for a number of dividers to that the starting signal for the counters can be delayed by, for example, a few minutes.

A manual control device 22 is provided for setting the change-speed system (pump 2 or motor 6 or both) for starting, stopping and further speed controls to be performed manually. The device 22 may be coupled electrically or by a mechanical linkage or by both with the control valves 20 and 21. The control described above of the drive of the tractor by means of control of the change-speed system 3 can operate until the load produced by the implement, for example, a plow working very heavy soil, increases to an extent such that the tractor tends to come to a standstill and the driven wheels tend to slip or spin relative to the underlying ground. In order to be able to avoid such conditions during automatic control, a wheel slippage control is provided. For this purpose a driven ground wheel 23 (which may be the wheel 7) is provided with a tachometer pick-up 24 and a non-driven ground wheel 25 with a tachometer pick-up 26. These pick-ups 24 and 26 are constructed and arranged similarly to the pick-up 14, i.e. an inductive pick-up disposed at the circumference of a metal disc having at its circumference notches, holes or other discontinuities so that a pulse is produced as each notch passes the pick-up, this pulse being applied to a counter or counters incorporated in a comparator 27. This applies both to the driven wheel 23 and the non-driven wheel 25. The non-driven wheel may be a non-driven front wheel or a freely rotatable ground-driven idler wheel provided for this purpose near the driven wheel 23, the axle of which is freely vertically pivotable.

In this case it is not the number of pulses per unit time that is counted, but the total number of pulses received from each wheel 23 and 25 respectively. Pulses generated by each wheel 23 and 25 are fed to associated counters. These counters are incorporated in the comparator 27 and continue counting up to full capacity (after which they return to zero and start counting again) or until the difference between the numbers of counted pulses corresponds to a preset number of additional revolutions of the engine-driven ground wheel compared with the ground-driven wheel. If the difference between the counts of these two counters corresponds to said preset number of additional revolutions of the engine-driven wheel 23 (for example, two revolutions), the comparator 27 delivers a signal which, after amplification, is fed through the leads 28 and 29, to the control valves 20 or 21 to cause one or both of them to shift to increase the transmission ratio of the change-speed system 3 so that the engine-driven ground wheel 23 rotates more slowly and less power is absorbed, the slippage of the wheel thus disappearing. When the tractor again operates normally, the signal delivered by the comparator 27 is cancelled so that the load-dependent control governed by the pick-up 14 again controls the load of the tractor.

When an engine-driven wheel skids, the signal from the comparator 27 indicating the preset difference between the number of revolutions turned by the engine-driven wheel 23 and by the ground-driven wheel 25 can also be applied to an amplifier 30, which then delivers an amplified signal to a control valve 31 of the lifting device 8 to 11 (lines 32, 33). Movement of the control valve 31 causes the lifting arms 8 to be lifted so that the plow penetrates less deeply into the soil and the retarding force decreases. The tractor will then travel on with control being effected by means of the tachometer 14.

A manual control device 34 of the lifting device 8 to 11 is provided, as is shown schematically in FIG. 1, but this is not part of the automatic control system.

As soon as the tractor moves on after the lifting device has been lifted and the driven wheel or wheels 23 are no longer slippage, the control valve 31 is reset to a position set by the manual control device 34, since the energization by the comparator signal is cancelled. If during travel of the tractor the retarding force of the implement again increases above the set maximum power of the engine 1, the change speed system 3 is again regulated from the comparator 27 through the leads 28, 29 and the control valves 20, 21 in the event of skidding. If at an increase in tractive force and at a set maximum power slippage of the wheels does not occur, the control of the drive is taken over by the tachometer 14, which actuates the swashplates 18 and 19 at a decrease in engine speed through the signal processing device 15 so that the travel speed of the tractor decreases. If the tractor speed decreases very drastically and wheel slippage occurs, the change-speed system is controlled from the comparator 27 through the lines 28 and 29 causing a further shift of the swash plates 18 and 19. If in the extreme the tractor stands still with the wheels spinning, the lifting device is again lifted and so forth.

The control systems described may be employed separately or in any desired combination. A separate or combined application of the described control systems can be selected by the driver by means of a switch provided near the driver's seat. A further control may be added on the basis of the above-mentioned difference signal in the comparator device 15 which appears when the actual speed of the driving engine is lower than a speed set by the manual control 13. This signal from the comparator device 15 can be applied through a lead 34A, an amplifier 34B and a lead 34C to the control valve 31 of the lifting device. Therefore, in dependence upon the deviation from the set speed, the lifting device can be controlled either separately or in conjunction with one or more of the other controls described above. For example, if the change-speed system causes the tractor to stand still by the control of the swashplates 18 or 19 or both in the event of a heavy load applied by the implement, the lifting device can be lifted by means of the same signal processing device 15 so that the tractor starts moving again since in the meantime the engine speed has been able to reach the set value.

Figure 2:
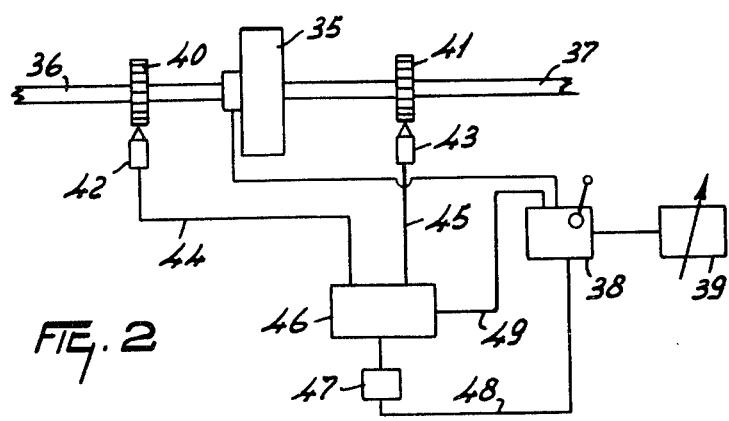
FIG. 2 shows a circuit diagram representing an arrangement for automatically monitoring the coupling of a power take-off shaft.

The circuit arrangement shown in FIG. 2 relates to automatic monitoring of a coupling 35 etablishing a connection between a shaft 36 driven by the engine 1 and a driving shaft 37 of a power take-off shaft of the tractor. The coupling 35 is constructed in the form of a plate coupling, the plates being pressed against one another hydraulically to couple the shafts 36 and 37 together. The hydraulic pressure may be supplied by a hydraulic circuit including, for example, the pump 12 of the lifting device, while a control device 38 is provided including a hydraulic control valve by which the fluid pressure can be manually regulated so that the plates of the coupling 35 engage one another. In order to be able to set the maximum torque an adjustment device 39 is connected to the control device 38 for setting the maximum pressure on the coupling plates.

The driven shaft 36 is provided with a disc 40 having evenly spaced notches or other discontinuities around its circumference, and the driving shaft 37 is provided with a similar disc 41. Near the circumference of each disc 40 and 41 there is an inductive pick-up 42 and 43 respectively. Each of the pick-ups 42 and 43 produces a pulse when a notch at the circumference of the disc concerned passes the pick-up. These pulses are conducted along leads 44 and 45 respectively to one or more electronic counters in a comparator 46, one or more counters being provided for each separate pick-up 42 and 43 respectively. These counters continuously count the number of pulses from the identical discs 40 and 41 respectively. When the discs 40 and 41 perform the same number of revolutions per unit time, the positions of the counters will be equal at any instant. When each of the counters is at its maximum count, the counters are reset to zero so that they can start again.

If, however, the torque demanded by the implement driven by the power take-off shaft becomes undesirably high, the plates of the coupling 35 will slip so that the pick-up 42 will count a higher number of pulses than the pick-up 43. A comparator connected to the counters detects this difference and provides a signal when the difference exceeds a predetermined value. This predetermined value may correspond, for example, to a difference of six revolutions between the discs 40 and 41. The difference signal is amplified by a signal amplifier 47 and applied through a line 48 to the control device 38, and its control valve is shifted by said amplified signal to a position in which the pressure of the hydraulic circuit pressing the plates of the coupling towards one another is relieved so that the shafts 36 and 37 are subsequently disconnected from one another. After the excessive torque required by the implement is reduced (for example, by the lift of the lifting device), the shafts 36 and 37 are recoupled by resetting the control valve of the control device 38 (preferably by hand).

It should be noted that the counters incorporated in the comparator 46 should preferably start counting only after a given period of time subsequent to the start of the operation. When the implement is started, slip will often occur in the coupling 35 so that the coupling would disengage immediately after starting of the implement. In order to avoid this disengagement, the control device 38 includes an astable multivibrator coupled with dividers giving off the first signal of the multivibrator for example, after a delay of one minute through a lead 19 as a start signal for the two sets of counters.

Although various features of the tractor described and illustrated in the drawing, will be set forth in the following claims as inventive features, the invention is not necessarily limited to these features and may encompasses other features disclosed both individually and in various combinations.

Having described our invention, what we claim as new and to be secured by Letters Patent of the United States is:

1. A tractor comprising an engine, wheels driven by said engine, a lifting device for attachment of an implement, sensing means including a ground rotated member, control means comprising two like counters which operatively continuously count revolutions of at least one of said driven wheels and the equivalent revolutions of said ground rotated member from a common starting point and comparator means for providing a signal when there is a preset difference between the respective counted revolutions of said one wheel and the counted said equivalent revolutions of said ground member without regard to the specific respective rotational speeds of said one wheel and said ground member as such, said lifting device including lifting means for raising an implement when attached thereto, means for energizing said lifting means to raise an implement when attached thereto, an operative connection between said control means and said energizing means which is adapted to cause said lifting means to be energized and to raise an implement when attached thereto upon receiving said signal, and means for resetting said counters to said starting point after said lifting means has been energized, each said counter independently counting from its starting point to capacity and returning to zero to continue counting until reset by said resetting means.

2. A tractor in accordance with claim 1 wherein said ground rotated member comprises a further wheel.

3. A tractor in accordance with claim 1 wherein said lifting means comprises double-acting hydraulic rams.

4. A tractor in accordance with claim 3 wherein said energizing means comprises a control valve which actuates said hydraulic rams.

5. A tractor in accordance with claim 1 wherein said means for resetting said counters to said starting point is manually operated.

* * * * *